E. CANTONO.
AUTOMATIC DEVICE FOR STARTING EXPLOSION OR OTHER ENGINES.
APPLICATION FILED MAR. 28, 1913.
1,217,563.
Patented Feb. 27, 1917.
3 SHEETS—SHEET 1.
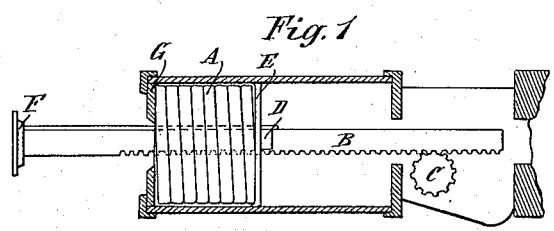
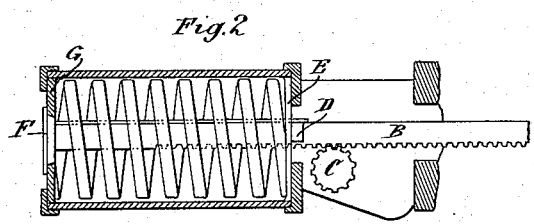
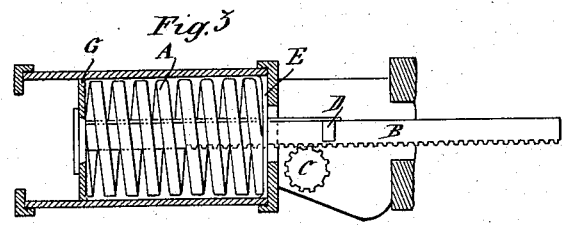
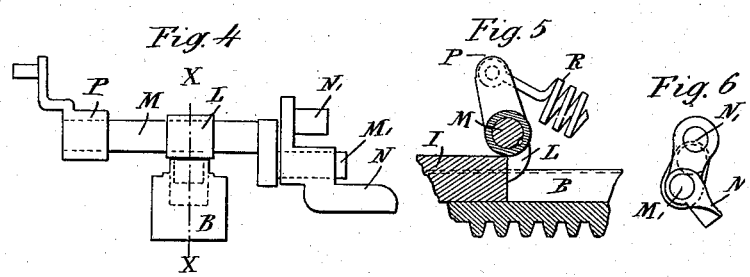
WITNESSES
Frank H Logan
Cornelius Hering
INVENTOR
EUGENIO CANTONO
By H Van Dresser
ATTORNEY E. CANTONO.
AUTOMATIC DEVICE FOR STARTING EXPLOSION OR OTHER ENGINES.
APPLICATION FILED MAR. 28, 1913.

1,217,563.

Patented Feb. 27, 1917.
3 SHEETS—SHEET 2.

WITNESSES
Frank H. Logan
Cornelius H. Young

INVENTOR
EUGENIO CANTONO
By H. van Detemmel
ATTORNEY

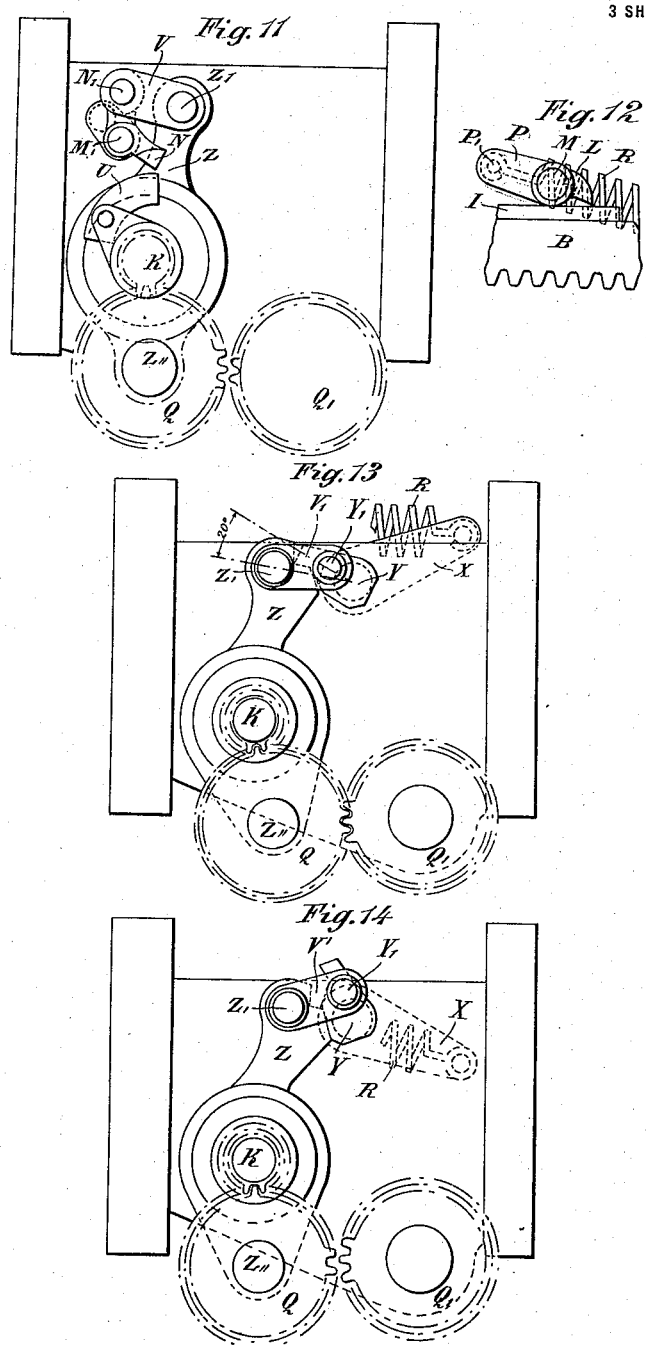

UNITED STATES PATENT OFFICE.

EUGENIO CANTONO, OF ROME, ITALY, ASSIGNOR TO ENRICO GARDA, OF PARIS, FRANCE.

AUTOMATIC DEVICE FOR STARTING EXPLOSION OR OTHER ENGINES.

1,217,563.        Specification of Letters Patent.        Patented Feb. 27, 1917.

Application filed March 28, 1913. Serial No. 757,397.

*To all whom it may concern:*

Be it known that I, EUGENIO CANTONO, a subject of the King of Italy, residing at Rome, Italy, major of engineers in the reserve, (whose post-office address is No. 11 Via Firenze,) have invented an Improved Automatic Device for Starting Explosion or other Engines, of which the following is a specification.

In spring operated automatic engine-starters for explosion motors and revolving shafts generally, the mechanism sometimes gets out of order so that the spring, being disengaged, no longer carries the motor along, and the energy stored in the spring finding no work to do in its distention, the latter will be very violent and impart a very great speed to the different parts of the moved mechanism, and at the stopping of the said parts at the end of the run damage may be produced.

The object of my present invention is to provide a device by which the same spring used for the normal operation of the apparatus is acting as a buffer or shock absorber so as to prevent damage in case of any irregularity occurring in the operation of the device.

The invention is illustrated by way of example in the annexed drawings in which—

Figure 1 is a longitudinal section of the automatic engine starter with the spring kept loaded (compressed);

Fig. 2 is a longitudinal section showing the spring unloaded or disengaged (expanded);

Fig. 3 is a view of the rack in the position of the spring being disengaged and therefore not producing any useful work;

Fig. 4 is a front view of the main shaft —M— which being controlled by the rack causes the parts to occupy the different positions which produce the disengagement;

Fig. 5 is a section on line $x$—$x$ of Fig. 4 showing the main shaft in the position occupied by the tooth —L— engaging the rack;

Fig. 6 is a partial front view of shaft —M— with piece —N— capable of oscillating about —M$^1$—;

Fig. 11 shows the mechanism of Fig. 7 in its position during the inactive or idle expansion of the spring;

Fig. 12 shows the position of shaft —M— —M— during the idle expansion of the spring;

Fig. 13 is a view of the device for keeping engaged the two gears designed for transmitting the driving effort to the rack;

Fig. 14 shows the device of Fig. 13 in the position occupied when the compression of the spring, in normal action, having ceased either by breakage of spring or by the interposition of the fragments of some broken piece, one of the gears prevented from acting has repelled the other by reaction.

In the said figures an automatic engine starter is disclosed in which spring —A— is kept compressed by a plate —E— supported on shoulders —D— placed on a rack —B— in gear with a pinion —C— by which the starting rotation is transmitted to the motor. The toothing of the rack which under the compression of the spring is kept in locked position by a suitable movable stop is extended beyond plate —E— supported thereby and through an opening of plate —G—. The said opening is large enough to give passage to the rack but too small for the passage of a nut —F— fixed on the extension of the rack at a distance from plate —G— equal to the length of rack extending from plate —G— during the compression of the spring.

In Fig. 2 the spring is shown expanded and the rack in the position which it assumes when in regular action the force stored up in the spring has been taken up by the started shaft. In this position nut —F— simply abuts against plate —G—.

In Fig. 3 the rack is shown in the position which it assumes when the spring is relieved without producing useful work. In this case, after the spring has expanded up to filling the entire space left therefore in the interior of the apparatus, the rack under the action of the live power possessed by it and by the elements mechanically coupled thereto has continued its transfer movement up to complete absorption of said power by compression of the spring in the opposite direction produced by nut —F— acting on the movable support plate —G— of the spring.

In automatic engine starters the very motor once started re-loads the spring by temporary engagement of adapted mechanical elements for the time necessary for said re-loading.

In case the apparatus is out of order it is necessary—

(1) That the coupling for re-loading is not effected during the time in which the rack by compression of spring in opposite direction is absorbing its undue speed, which time corresponds to the passage of the rack from the position of Fig. 2 to the position of Fig. 3;

(2) That on an inactive expansion of the spring being produced the operation of the coupling members for the shaft of motor —K— and the concentric pinion —$K_1$— (Fig. 7) acting on rack —B— to carry it along in the direction of re-loading of spring,—is automatically interrupted.

In Figs. 4, 5, 6, 7 and 8 a form of the device is shown which fulfils the conditions exposed at 1 and 2.

In Fig. 5 it is seen that on rack —B— a piece —I— is placed the end of which, when the rack is locked in the position in which it is shown in the said figure, abuts against a tooth —L— fixed on shaft —M— which latter has at its end an eccentric pivot on which a piece —N— is adapted to oscillate, and at its other end a small arm —P— to which the end of a spring —R— is fixed for constantly keeping tooth —L— against piece —I—.

Figure 7:
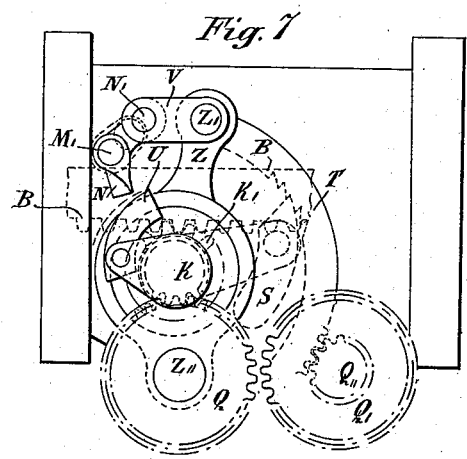
Fig. 7 is a front view of the control mechanism for transmitting the driving effort to rack —B— while the spring is being reloaded.
Figure 8:
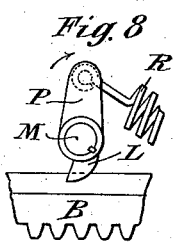
Fig. 8 shows the rack in a different position from that shown in Fig. 5.
Figure 9:
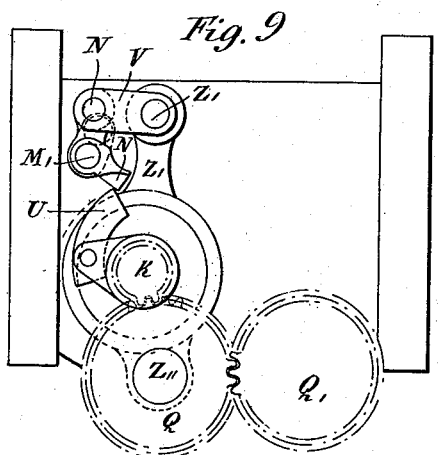
Fig. 9 shows the front part of the control mechanism shown in Fig. 7, the gearing being shown in the re-loading position of the spring.

In Fig. 7 the motor shaft —K— is shown, which from the moment of starting is operated by pawls —S— fixed thereon which engage the teeth of crown wheel —T— which is connected to pinion —$K_1$— meshing with the rack —B— on the expansion of the spring. When the expansion of the spring is complete and the engine starts the pawls S automatically disengage the crown wheel T. When the motor is started the end of a movable pawl —U— on the motor shaft —K— describes a trajectory in the path of which is, or is not, placed the end of piece —N— according to the different positions occupied by rack —B— which by pushing tooth —L— (Figs. 5, 7 and 9) more or less rotates shaft —M— about which turns pivot —$M_1$— which is of one piece with it, and by its shiftings shifts the end of piece —N— in and out of the said trajectory (Figs. 7, 9 and 11). Piece —$N^2$— also has a pivot —$N_1$— which by a joint —V— acts on pivot —$Z_1$— fixed on a lever —Z— capable of turning concentrically to motor shaft —K—. The said lever also has another pivot —$Z_{11}$— on which turns a gear —Q— meshing with a pinion keyed to motor shaft —K—, which freely rotates within the concentric pinion —$K_1$— when the pawls do not engage the teeth of crown wheel —T—.

Pivot —$Z_{11}$— when lever —Z— turns about, the motor shaft, shifts gear —Q— which it supports so that its teeth come in and out of mesh with the teeth of an intermediate gear —$Q_1$—for the transmission of the movement of the motor shaft to the rack through wheel —T— connected to pinion —$K_1$— meshing with the rack.

It may happen sometimes, as said above, that the spring breaks and the fragments interposing between the intact coils produce an obstruction preventing the rack from getting to the end of its travel when the spring is re-loaded.

The cessation of re-loading produced by the motor is ordinarily caused by the very advancement of the rack, a pusher on it effecting, in a given moment, the release of the parts by which the motor carries the rack along. If the obstruction produced by the fragments of the broken spring prevents the rack from arriving to the point of effecting the said release, in the moment the rack is stopped the members designed to transmit the effort of the motor thereto are deformed, and breakage of apparatus is inevitable.

In starting as described the members producing the coupling or engagement by which the effort of the motor is transmitted to the rack are so arranged as to permit that the uncoupling or disengagement is produced automatically as soon as the effort to be conquered exceeds the one produced by the compression of the spring.

In Fig. 13 of the annexed drawings this arrangement is shown. Lever —X— which is acted upon by the small spring —R— is rigid with the eccentric pivot —$Y_1$— connected by joint —$V_1$— to pivot —$Z_1$— fixed on lever —Z—. The latter is capable of turning about the motor shaft —K— and has a gear —Q— meshing with a small pinion keyed on shaft —K— and serving for transmitting the effort of the motor to the rack by pinion —$Q_1$— and other intermediate members. It will be seen that by this arrangement, if lever —X— is turned on its pivot —Y—, lever —Z— also is turned on its pivot —K— and gear —Q— moved to or from gear —$Q_1$—.

When the two gears —Q— and —$Q_1$— are in mesh, which occurs during re-loading of the spring, pivot —$Y_1$— is not on the same straight line connecting the center of pivot —Z₁— to the center of pivot —Y— (which would form an irreversible system resisting any reaction taking place between the said two gears, and tending to move them apart), but at 20° above the said line, so that the coupling of the gears —Q— and —Q₁— during compression of spring is kept, not by the reaction between pivots —Z₁— —Y₁— and —Y—, forming in this case a reversible system, but by the traction of the small spring —R— balancing the repulsion effort set up between the said two gears.

It will be seen that by this device the power of the spring may be so controlled that it will be just sufficient to resist the reaction tending to move gears —Q— and —Q₁— apart during the normal re-loading of the spring of the apparatus; but very soon the effort transmitted between the said two gears exceeding a certain value (which occurs in case of breakage of spring) the reaction between the said gears becomes excessive, spring —R— yields permitting pivot —Y— to turn in the direction of the arrow (Fig. 13) and pass from the position of Fig. 13 to that of Fig. 14 which causes uncoupling of gears —Q— and —Q₁— and interruption of transmission of the motor effort to the rack.

The operation of the means for carrying this out is as follows:

Starting is accomplished through the action of the wheel T acting upon the pawls S. Rewinding is accomplished through the gears Q, Q₁, Q₁₁, T and K₁.

When the rack is in the position of compressed spring (Fig. 1) tooth —L— not being pressed by piece —I— on rack —B— is shifted by spring —R— (Fig. 8) turning in the direction of the arrow, and the end of piece —N— leaves the path of the end of pawl —U— (Fig. 7).

Figure 10:
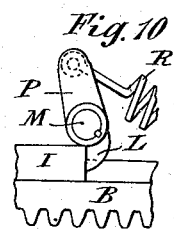
Fig. 10 is a view similar to Fig. 5, its purpose being to render Fig. 9 intelligible at a glance and representing the position of the rack at the start of the compression of the spring.

When the spring is regularly unloaded or expanded, and rack —B— is in the position of Fig. 2, tooth —L— (Fig. 10) is turned in opposite direction to the arrow, and the end of piece —N— is in the path of the end of pawl —U— (Fig. 9), the abutment of the said end against tooth —L— pushing the latter which in turn by pivot —N— and joint —V— transmits the pushing movement to pivot —Z₁— which turns lever —Z— until gear —Q— comes into mesh with gear —Q₁— and consequently the spring is re-loaded.

If the distention or expansion is violent the rack does not stop in the position shown in Fig. 2 but moves farther so as to compress the spring in opposite direction; in this case tooth —L— is pushed farther (Fig. 12) than in the first case (Fig. 10), and piece —N— passing in the path of the end of the pawl —U— is no longer carried along thereby because the shift of the tooth —L— (Figs. 11 and 12) imparts to piece —N— a greater speed than that of pawl —U—, and consequently there will be no more transmission of pushing to pivot —Z₁— nor of moving lever and meshing of gears —Q— and —Q₁— for re-loading. The rack by reversing its movement up to arriving at the position of Fig. 2, the tooth —L— slides on the top of piece —I— (Fig. 12), and the angle formed by the spring supporting arm —P— in this position,—in relation to the position occupied thereby when rack —B— is in the position of Figs. 2 and 10, when the spring keeps tooth —L— pressed against piece —I— of rack —B—, will be such that the action of the spring will be directed on the alinement, or approximate alinement of spring-engaging pivot —P¹— and the center of rotation of shaft —M— so that once this position is acquired the spring no longer acts to turn the shaft, and when the rack is restored to the position of Fig. 2 the tooth —L— is not restored to the position in which re-loading of spring may occur (Fig. 10) without the intervention of the engineer charged with the repair of the apparatus.

Having now particularly described and ascertained the nature of my said invention and in what manner the same is to be performed, I declare that what I claim is:

1. In an engine starter, a spring; means for limiting its movement in opposite directions; a rack controlled by the spring; abutments on said rack a distance apart; a plate between each abutment and an end of the spring and having play relative to the rack; and an operative connection between the rack and the engine for loading and unloading the spring.

2. In an engine starter, a helical spring; a housing therefor having shoulders at opposite ends; a plate between each end of the spring and the adjacent shoulder of the housing and each having an opening therein; a rack passing through the spring and said openings; abutments on the rack each adapted to engage an outside face of each of said plates; and an operative connection between the engine and the rack for loading and unloading the spring.

3. In an engine starter, a plate, a rack controlled by a spring, a wheel on a shaft connected to the engine, and in mesh with said rack, a metal piece fixed to said rack, a shaft, a tooth fixed to said shaft, a lever connected to said shaft, a pawl connected to the shaft attached to said engine and means for preventing the reloading of said spring when the lever attains a higher speed than the pawl.

4. In an engine starter, a plate; a main spring; a rack controlled by the main spring; the engine shaft; a wheel on the shaft and meshing with said rack; a metal piece fixed to said rack; a small shaft provided with a tooth and a lever arm; and a spring attached to the lever arm; said metal piece striking said tooth and moving the small shaft and the lever arm until the traction of the main spring is reduced to zero.

In testimony whereof I have affixed my signature in presence of two subscribing witnesses.

EUGENIO CANTONO.

Witnesses:
 DUILIO NARDONI,
 ROMMASO BORTOLUSS.

Copies of this patent may be obtained for five cents each, by addressing the "Commissioner of Patents, Washington, D. C."